US007509357B2

United States Patent
Lohn et al.

(10) Patent No.: US 7,509,357 B2
(45) Date of Patent: *Mar. 24, 2009

(54) TRANSPARENT FILE RESTORE

(75) Inventors: Michelle Lisa Lohn, Los Gatos, CA (US); Ketury Ann Stein, Santa Cruz, CA (US); Michael C. Timpanaro-Perrotta, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 220 days.

This patent is subject to a terminal disclaimer.

(21) Appl. No.: 11/190,251

(22) Filed: Jul. 26, 2005

(65) Prior Publication Data

US 2005/0262174 A1    Nov. 24, 2005

Related U.S. Application Data

(63) Continuation of application No. 10/099,338, filed on Mar. 14, 2002, now Pat. No. 6,950,836.

(51) Int. Cl.
*G06F 17/30* (2006.01)
(52) U.S. Cl. .................. 707/204; 707/200; 707/202; 707/203; 714/36
(58) Field of Classification Search ......... 707/202–204; 714/36
See application file for complete search history.

(56) References Cited

U.S. PATENT DOCUMENTS

| | | | | |
|---|---|---|---|---|
| 5,177,744 A | * | 1/1993 | Cesare et al. | 714/6 |
| 5,485,606 A | | 1/1996 | Midgdey et al. | 395/600 |
| 5,488,702 A | * | 1/1996 | Byers et al. | 713/200 |
| 5,559,991 A | | 9/1996 | Kanfi | 395/489 |
| 5,634,052 A | * | 5/1997 | Morris | 707/1 |
| 5,745,669 A | | 4/1998 | Hugard et al. | 395/182.01 |
| 5,778,395 A | | 7/1998 | Whiting et al. | 707/204 |
| 5,870,468 A | | 2/1999 | Harrison | 380/4 |
| 5,924,102 A | | 7/1999 | Perks | 707/200 |
| 5,951,686 A | * | 9/1999 | McLaughlin et al. | 713/2 |
| 5,991,772 A | | 11/1999 | Doherty et al. | 707/202 |
| 6,330,570 B1 | * | 12/2001 | Crighton | 707/204 |
| 6,353,834 B1 | * | 3/2002 | Wong et al. | 707/202 |
| 6,459,624 B1 | * | 10/2002 | Kuo | 365/185.33 |
| 6,526,438 B1 | * | 2/2003 | Bienvenu et al. | 709/219 |
| 6,732,125 B1 | * | 5/2004 | Autrey et al. | 707/204 |
| 2002/0065999 A1 | * | 5/2002 | Kikuchi et al. | 711/162 |

* cited by examiner

*Primary Examiner*—Cam-Linh Nguyen
(74) *Attorney, Agent, or Firm*—Janaki K Davda; Konrad Raynes & Victor LLP

(57) ABSTRACT

Provided is a method, system, and program for automatically handling an error when retrieving a file for an application. An error is detected while the application retrieves a file from the storage device. A user defined policy is checked to determine whether a backup copy should be restored, and the file is restored from the backup copy if the user defined policy indicates that the backup copy should be used.

9 Claims, 6 Drawing Sheets

FIG. 6

| User Defined Policy | Default Settings |
|---|---|
| File is unreadable, and no changes since last backup | Yes, restore automatically |
| File is unreadable, but was changed since last backup | Yes, restore automatically |
| File is missing, and no changes since last backup | Yes, restore automatically |
| File is missing, but was changed since last backup | Yes, restore automatically |

TRANSPARENT FILE RESTORE

CROSS-REFERENCE TO RELATED APPLICATIONS

This application is a continuation application of and claims the benefit of "METHOD, SYSTEM, PROGRAM FOR A TRANSPARENT FILE RESTORE", U.S. Pat. No. 6,950,836, issued on Sep. 27, 2005, having application Ser. No. 10/099,338, filed Mar. 14, 2002, the disclosure of which is incorporated herein by reference in its entirety.

BACKGROUND OF THE INVENTION

1. Field of the Invention

The present invention relates to a system, method, and program for automatically restoring corrupt or missing data files.

2. Description of the Related Art

Applications running on a host or server system typically retrieve and store data files on a storage device. The storage device may be comprised of a simple disk drive or multiple disks, such as the case with a Direct Access Storage Device (DASD), Just a Bunch of Disks (JBOD), a Redundant Array of Independent Disks (RAID), etc. Periodically, access to a file or a collection of files can simply fail for a number of reasons, such as a media Input/Output (I/O) error due to a corrupted file, or the prior deletion of the file, unintentional or not. The most common cause of I/O errors is the operating system crashing (e.g. resource sharing errors, software incompatibility, etc.) or improper shutdown of the system.

When such errors occur, the application accessing the data file usually fails also. Typically, the user must start a separate application to restore the necessary files and then restart the failed application from the beginning. A significant loss of time and productivity is often incurred during this process. Furthermore, the end-user may not always be familiar with the operation to restore the lost or corrupt file(s), and this process may require the intervention of a support person or group to complete.

For these reasons, there is a need in the art to provide techniques to better manage access failures to avoid system disruption.

SUMMARY OF THE PREFERRED EMBODIMENTS

Provided is a method for automatically handling an error when retrieving a file for an application. An error is detected while the application retrieves a file from the storage device. A user defined policy is checked to determine whether a backup copy should be restored, and the file is restored from the backup copy if the user defined policy indicates that the backup copy should be used.

Additionally, all modifications to files are monitored in a change log and all file retrieval requests are monitored for errors. Moreover, a determination is made on whether the file has been modified since the backup copy was made. The determination can be made by comparing the modification date in the change log and the time of when the backup copy was made.

In further implementations, the user defined policy is capable of indicating when the backup copy should be used in one of multiple circumstances. The multiple circumstances can include, but are not limited to, situations where the file is damaged and no modifications were made since the backup copy was made; the file is damaged and modifications to the file have been made since the backup copy was made; the file is missing and no modifications were made since the backup copy was made; and the file is missing and modifications to the file have been made since the backup copy was made.

In still further implementations, the backup copy is transmitted according to the user defined policy wherein the backup copy is provided to the application if the user defined policy authorizes the use of the backup copy or the error message is provided to the application without the backup copy if the user defined policy does not authorize the use of the backup copy.

By providing an automatic file restore function, when an error occurs during the retrieval of a file, the application will not fail because of the error. Thus, the present invention alleviates the need to start a separate application to restore the necessary files and eliminates the need to restart the failed application from the beginning. Moreover, the end-user will not need the intervention of a support person or group to complete the file restore even if the user is not familiar with the operation to restore the lost or corrupt file(s). Thereby, a significant amount of time, cost, and productivity is saved.

BRIEF DESCRIPTION OF THE DRAWINGS

Referring now to the drawings in which like reference numbers represent corresponding parts throughout:

FIG. 6 illustrates the default settings of the user defined policy in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
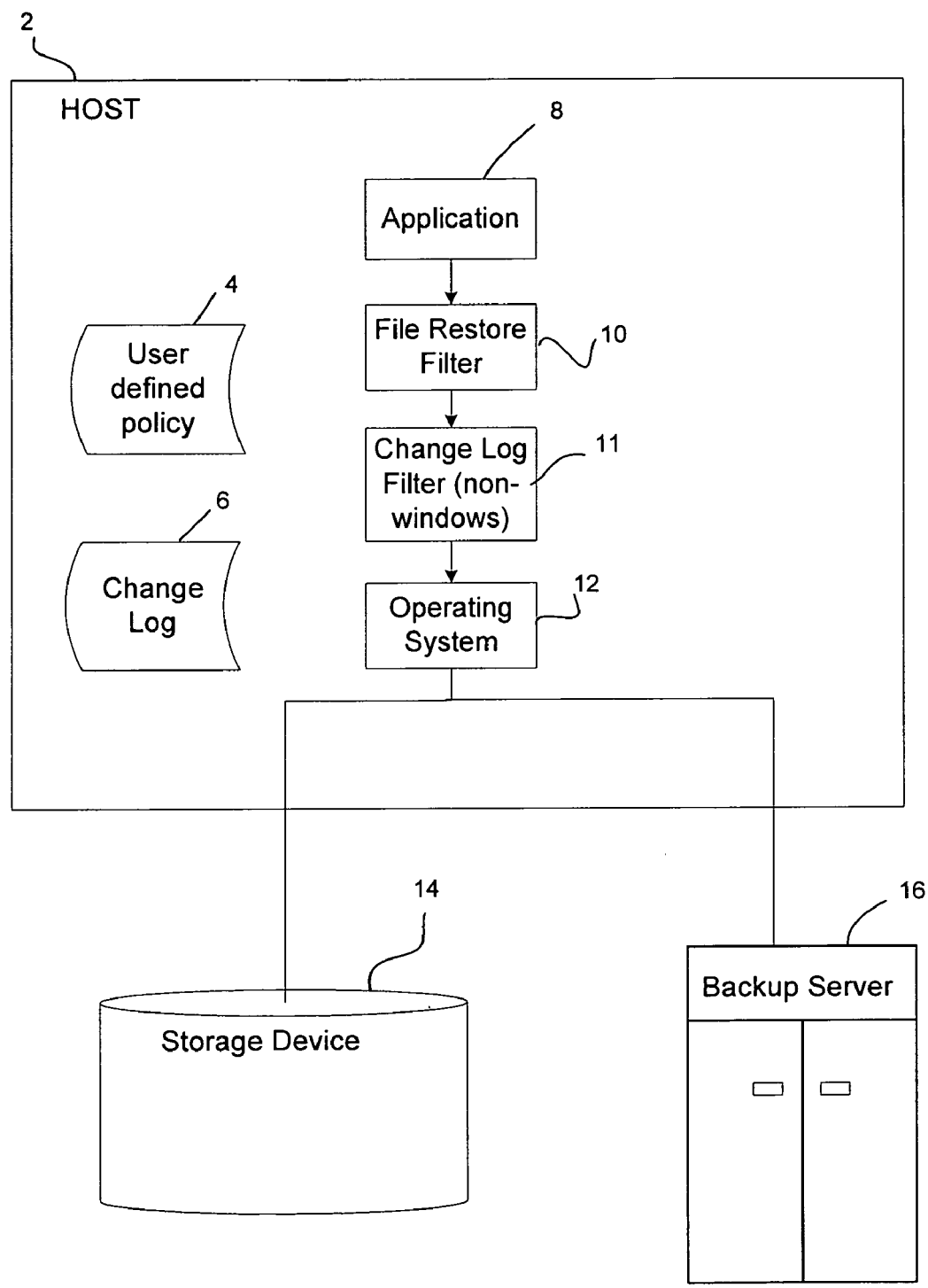
FIG. 1 illustrates a computing environment in which aspects of the invention are implemented.

FIG. 1 illustrates a computing environment in which aspects of the invention are implemented. A host system 2 typically includes one or more application programs 8 running on an operating system 12. The application programs 8 can comprise any database program, word processing program, spreadsheet program, etc. that is known in the art. The operating system 12 can be a UNIX based system or a WINDOWS** system. In between the operating system 12 and the application program 8 is a file restore filter 10, which monitors all Input/Output (I/O) requests to a storage device 14. In addition, in a non-Windows environment, a change log filter 11 also exists between the application programs 8 and the operating system 12, which tracks changes made to any files and records the date and time of the file changes in a change log 6. In a Windows environment, the native logging mechanism is used to generate the change log 6. The change log filter 11 is discussed below in greater detail with respect to FIG. 2. In the preferred embodiments, the file restore filter 10 contains the logic to perform the transparent restore function, which is activated if an error message is generated while retrieving a file from the storage device 14. The file restore filter 10 works in conjunction with the user defined policy 4, wherein the user defined policy 4 contains the preferences of the user for different error circumstances. The user defined policy 4 is stored in the storage device 14, but is retrieved to the host memory (not shown) as needed by the file restore filter 10. The file restore filter 10 and the user defined policy 4 will be discussed in greater detail with respect to FIGS. 3-5. The storage device 14 is comprised of any storage device known in the art including a simple disk drive or multiple disks, such as the case with a Direct Access Storage Device (DASD), Just a Bunch of Disks (JBOD), a Redundant Array of Independent Disks (RAID), etc. In addition to the storage device 14, a backup server 16 is also attached to the host system 2, which maintains backup copies of all files that are kept on the storage device 14. The backup server can comprise any known backup system known in the art.

**Tivoli is a trademark of International Business Machines Corporation. Windows is a trademark of Microsoft Corporation.

Figure 2:
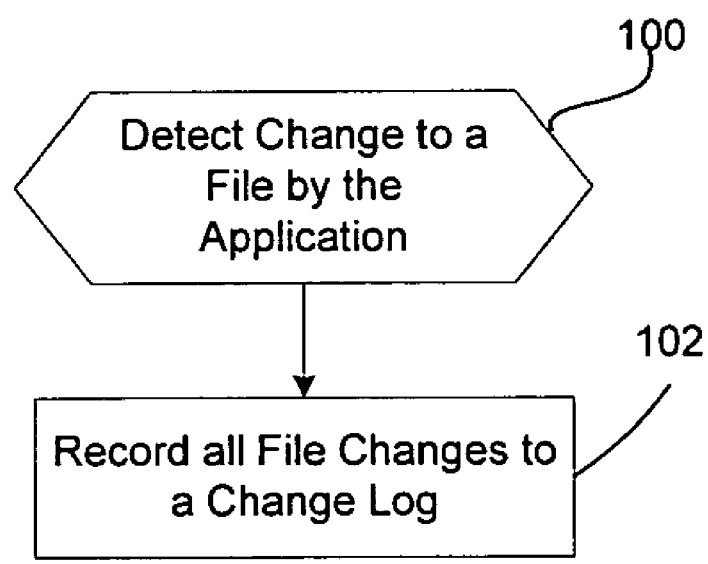
FIG. 2 illustrates logic implemented in a change log filter to maintain the change log.

FIG. 2 illustrates logic implemented in a change log filter 11 to maintain the change log 6. As changes are made to a file during the running of an application 8, the changes are detected when saved to the storage device 14 (at block 100) and recorded in a change log 6 (at block 102). If logging mechanisms exist in the operating system 12 they are used. For example, in a Windows environment, the native logging mechanism in Windows is used. Otherwise, a separate logging filter 11 is used to record all changes made by the application 8 to the files.

Figure 3:
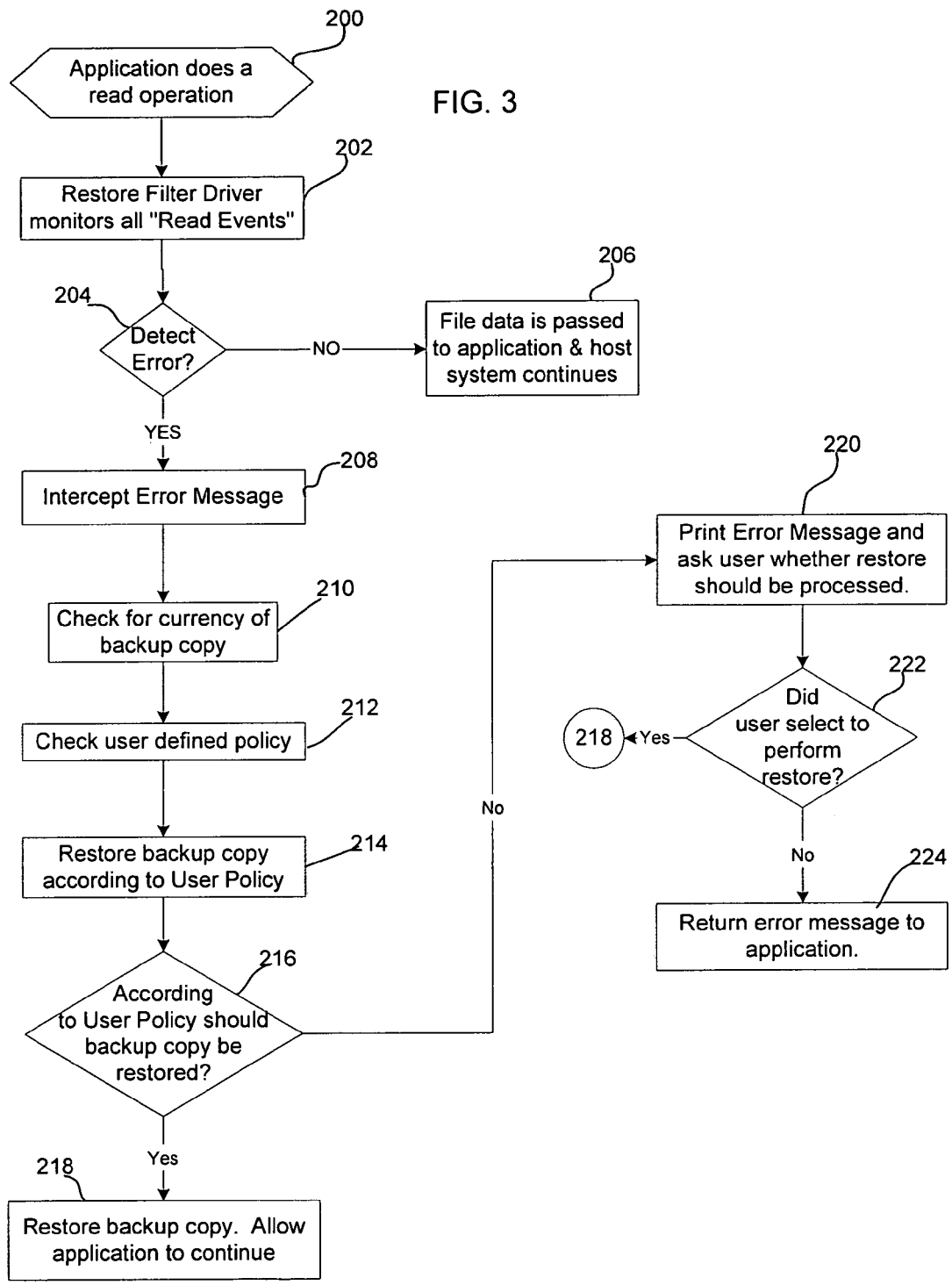
FIG. 3 illustrates. logic implemented in a file restore filter in accordance with implementations of the invention.

FIG. 3 illustrates logic implemented in the file restore filter 10 to perform the transparent restore function. In the described implementations, the file restore filter 10 is an extension to the kernel of the operating system 12. Upon the initialization of the host system 2, the file restore filter 10 is loaded into the memory as part of the kernel of the operating system 12. The file restore filter 10 monitors all read/write functions performed by an application that is being run on the host system 2. All open or read requests from the application 8 are passed through file restore filter 10 to the operating system 12. The file is retrieved by the operating system 12 and reported first to the file restore filter 10. If no problems are detected during the retrieval process, then the file is passed on (i.e filtered) to the application 8.

Control begins at block 200 where the application 8 performs a read operation. At block 202, all "read events" on files by the application 8 are monitored using the restore filter driver 10. If no problems are detected during the retrieval process, then the file is passed on (i.e filtered) to the application 8 at block 206 and the host system continues to operate normally. However, if the file to be retrieved is detected as being damaged or missing at block 204, the error message is intercepted by the file restore filter 10 at block 208. Depending on whether the error message sends back a file error as being damaged or missing, the transparent file restore function applies different logic with regards to checking the currency of the backup copy (at block 210). For damaged files, the file restore filter 10 checks the backup copy to determine if the backup copy is current by comparing the date of the last file backup with the date of the damaged file. On the other hand, if the file is missing (i.e. deleted), the change log is checked to determine whether the backup copy is current. Depending on the user setting (i.e. a check is made on the user defined policy 4 at block 212), the transparent file restore function will perform the appropriate function based on the state of the backup copy and the user defined policy 4 (at block 214). Additionally, the user defined policy 4 may specify no further action to perform beyond passing and logging an error message. The user defined policy 4 may be set for four different error circumstances: (1) File is unreadable, and no changes since last backup (2) File is unreadable, but was changed since last backup, (3) File is Missing, and no changes since last backup, or (4) File is Missing, but was changed since last backup. The user can choose to restore the backup copy, or to not restore the backup copy and just pass on the error to the application for each circumstance. If (at block 216) the file exists on the backup server 16 and the user defined policy 4 indicates that the file should be restored, a storage manager program (e.g. Tivoli** Storage Manager) is called (at block 218) to restore the file, and the application is allowed to proceed with the backup version of the restored file without causing the application to fail due to the error. Otherwise, an error message is printed (at block 220) and a dialog displayed to ask the user whether to proceed with the restore. If (at block 222) the user selects to proceed with the restore, control proceeds to block 218 to perform the restore. Otherwise, if the user does not select to proceed with restore, then an error message is returned (at block 224) to the application 8. The various user defined policies 4 for each error circumstance will now be discussed below in conjunction with FIGS. 4 and 5.

Figure 4:
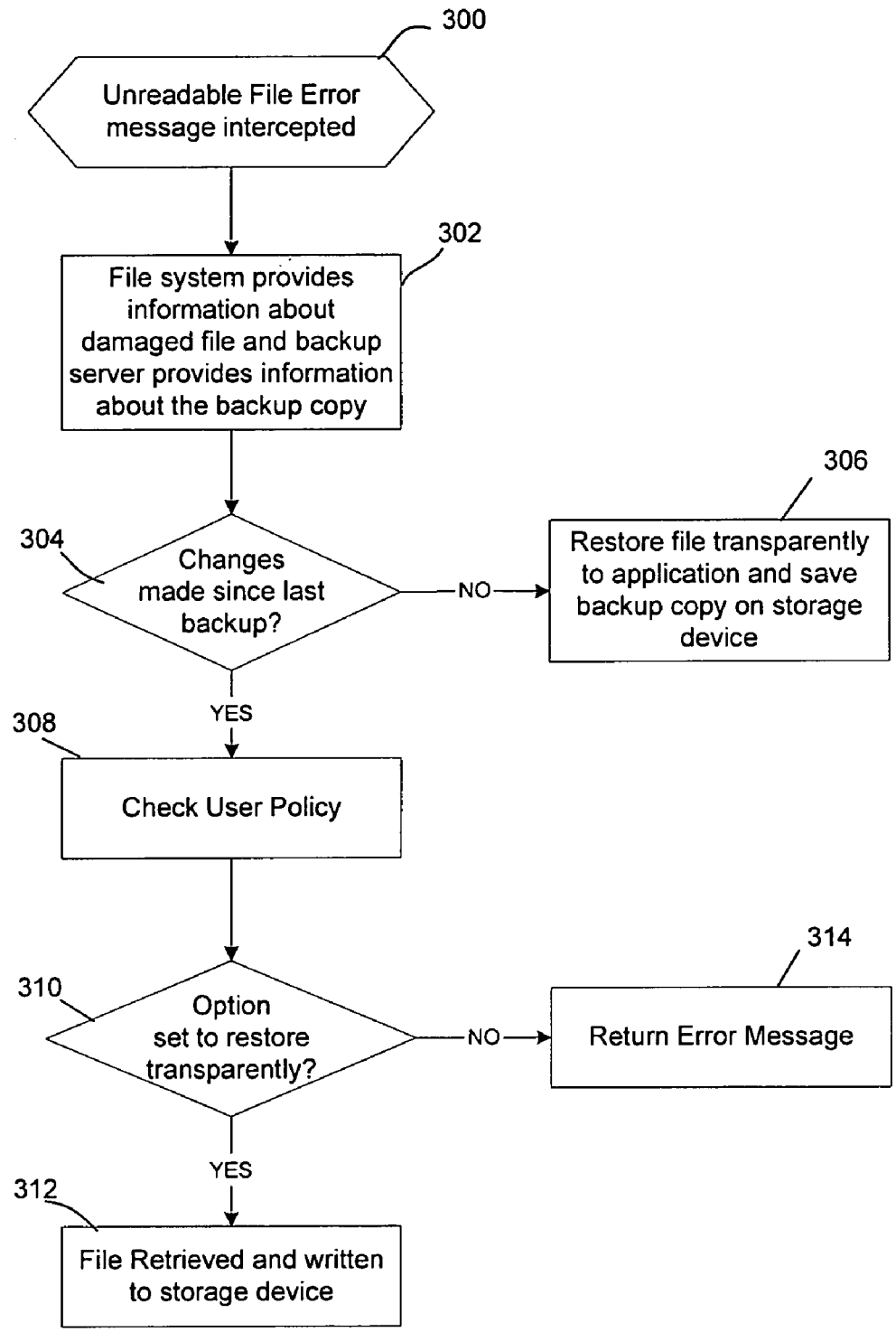
FIG. 4 illustrates logic implemented in the file restore filter to handle an unreadable file error in accordance with implementations of the invention.

FIG. 4 illustrates logic implemented in the file restore filter 10 to handle an unreadable file error in accordance with implementations of the invention. Control begins at block 300 with the file restore filter 10 receiving an unreadable error message from the operating system 12. Since the file exists, but unreadable, the file access authorization has likely been verified already and does not need to be checked again before the file restore function is implemented. Moreover, the user has the option to shut off the file restore filter 10 so that an error message is passed through even when there has not been any changes between the backup copy and the damaged file. At block 302, the file system, which is a part of operating system 12, provides the time of the last modification of the damaged file, and the backup server 16 provides the time of the last backup. The file restore filter 10 makes a comparison between the time of the last modification of the damaged file and the time of the last backup (at block 304) to determine whether changes have been made since the last backup copy.

If (at block 304) no changes were made to the damaged file since the last backup, at block 306, the file is retrieved from the backup server 16 and transparently restored to the application 8. If changes were made to the file since the last backup, the file restore filter 10 checks the user defined policy 4 for the user preference (at block 308). If (at block 310) the option to restore transparently is selected, the file is retrieved from the backup server 16 and written to the storage device 14 (at block 312). The backup copy is saved to the storage device 14 and the backup copy data is made available to the application 8. If the option to restore transparently is not selected by the user, the error message is passed through to the application 8 (at block 314).

Figure 5:
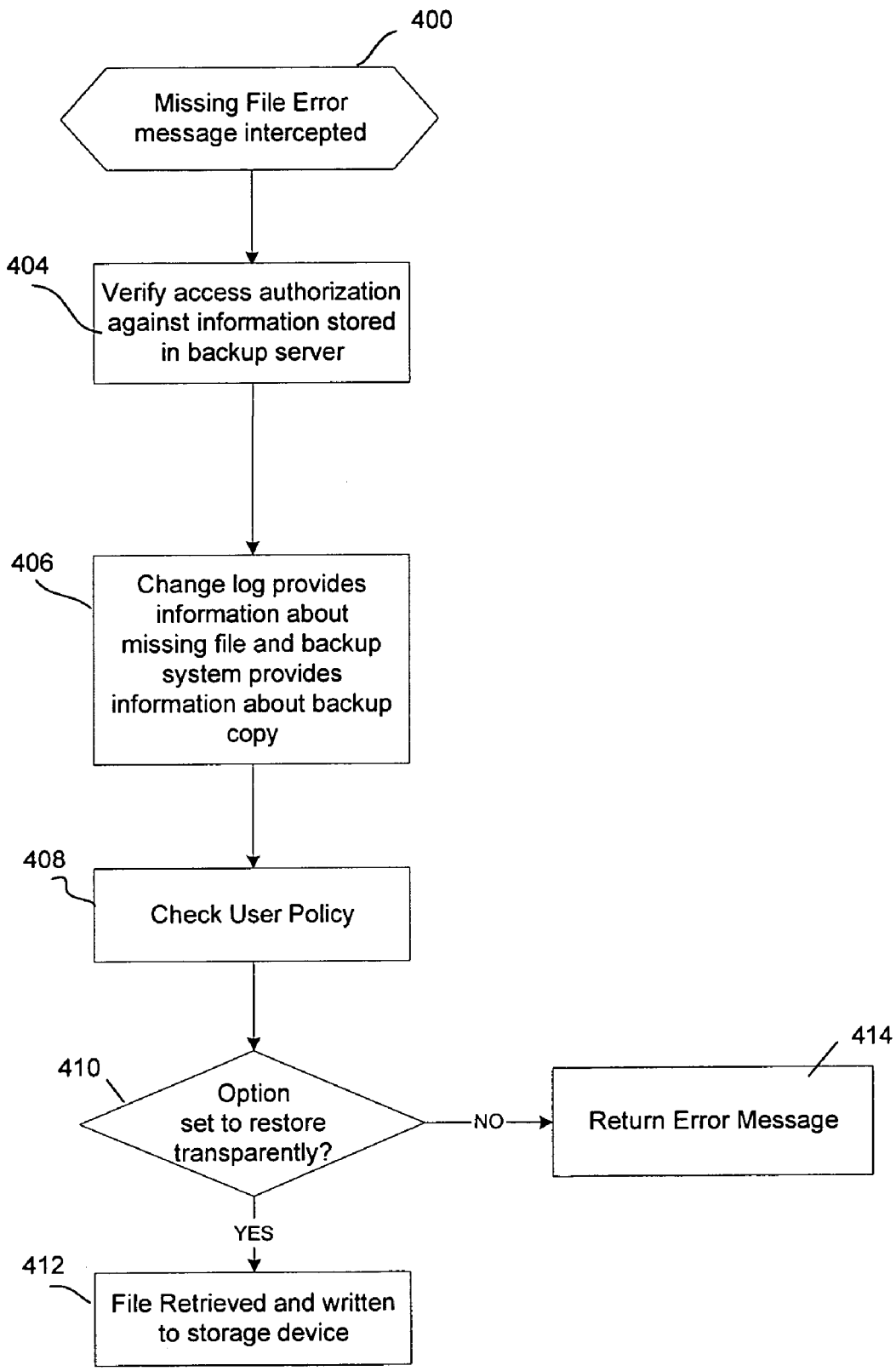
FIG. 5 illustrates logic implemented in the file restore filter to handle a missing file error in accordance with implementations of the invention.

FIG. 5 illustrates logic implemented in the file restore filter 10 to handle a missing file error in accordance with implementations of the invention. Control begins at block 400 with the file restore filter 10 receiving a missing file error message from the operating system 12. Since the file has been deleted or is missing, at block 404, access authorization will need to be verified against information stored in the backup server 16 to make sure the application 8 has authorization to access the backup copy. Once the verification is completed, the backup server 16 provides information about the backup copy (i.e.

time of backup) and the change log provides information about the missing or deleted file (i.e. time of last modifications to the file). Thus, based on the logging mechanism (or other change tracking mechanism) of the operating system 12 and the information provided by the backup server 16, the file restore filter 10 can determine whether changes have been made to file being retrieved since the last backup (at block 406). The file restore filter 10 also checks the user defined policy 4 for the user preference in such a case (at block 408). If the file exists on the backup server 16 and the user policy indicates that the file should be restored (at block 410), then the backup server 16 is used to restore the file (at block 412), and the application is allowed to proceed with the backup version of the restored file without causing the application to fail due to the error. As mentioned, the user defined policy 4 may not specify any particular action to perform. However, if the option to restore transparently is not selected by the user, the error message is passed through to the application 8 (at block 414).

FIG. 6 illustrates an example of the default settings on the user defined policy 4 in accordance with implementations of the invention. The default user defined policy 4 provides settings for four different error circumstances. (1) File is unreadable, and no changes since last backup (2) File is unreadable, but was changed since last backup, (3) File is Missing, and no changes since last backup, or (4) File is Missing, but was changed since last backup. The default may be set to restore the backup file automatically in all circumstances. However, the user can choose to modify the default setting for one or more error circumstance to not restore (and just pass as failure) depending on the user's preference. Still further, the user defined policy 4 may specify no further action to perform beyond passing and logging an error message. In such case, the default settings in the user defined policy table of FIG. 6 would specify no action to perform for one or more of the listed error circumstances.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code i which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The preferred logic of FIGS. 2-4 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

In addition, the file restore filter was described as being implemented in the kernel of the operating system. Alternatively, the file restore filter can be implemented in alternative ways, such as a part of the application program that interacts with the operating system, part of the operating system, a separate application program, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for automatically handling an error when retrieving a file for an application, comprising:
   under control of a file restore filter that is an extension to an operating system:
      detecting the error when the application attempts to retrieve the file from a storage device by intercepting an error message;
      checking a user defined policy to determine whether a backup copy should be restored, wherein the user defined policy indicates when the backup copy should be used in one of multiple circumstances based on whether the error is caused by a damaged file or by a missing file and based on whether modifications were made to the file since the backup copy was made; and
      restoring the file from the backup copy if the user defined policy indicates that the backup copy should be used, wherein the application proceeds with the file restored from the backup copy without failing due to the error.

2. The method of claim 1, further comprising:
locating a backup copy of the file if one backup copy is exists, wherein the user defined policy is checked and the file restored if the backup copy exists.

3. The method of claim 1, further comprising:
determining whether the file has been modified since the backup copy was made.

4. The method of claim 1, further comprising:
monitoring all modifications to files in a change log; and
monitoring all file retrievals for errors.

5. The method of claim 4, further comprising:
determining whether the file has been modified since the backup copy was made by comparing a modification date in the change log and the time of when the backup copy was made.

6. The method of claim 1, wherein providing the backup copy according to the user defined policy further comprises:
providing the backup copy to the application if the user defined policy authorizes use of the backup copy; and
providing an error message without the backup copy to the application if the user defined policy does not authorize the backup copy.

7. The method of claim 6, further comprises:
 verifying access authorization before providing the backup copy.

8. The method of claim 1, wherein a default setting for the user defined policy is to automatically restore the backup file copy.

9. The method of claim 1, wherein checking a user defined policy to determine whether the backup copy should be used only occurs if the file has been modified since the backup copy was made.

* * * * *